United States Patent Office 2,773,836

Patented Dec. 11, 1956

1

2,773,836

OXIDE-PROMOTED TITANIUM-PHOSPHORUS CATALYST

Harold Shalit, Drexel Hill, Pa., and Arthur P. Lien, Highland, Ind., assignors to Standard Oil Company, Chicago, Ill., a corporation of Indiana No Drawing. Application December 1, 1952, Serial No. 323,518

15 Claims. (Cl. 252—437)

The present invention relates to a catalytic material of improved properties in the promotion of hydrocarbon-conversion reactions. More particularly, the invention relates to a solid catalyst of high activity and long life, consisting essentially of an oxide-promoted reaction product of a titanium halide and a phosphoric acid.

Titanium chlorides and bromides, like aluminum chloride and various other catalysts of the Friedel-Crafts type, are excessively active in promoting various types of reactions for which they are otherwise satisfactory catalysts. It would therefore be a desirable improvement to subject the titanium halides to some form of physical or chemical treatment capable of moderating their excessive catalytic activity. Such a treatment is described in our copending application, Serial No. 323,517, filed December 1, 1952, wherein a titanium halide is commingled and heated with a phosphoric acid at a temperature above about 175° C. until the evolution of hydrogen halide substantially ceases. Catalysts of greatly improved properties are obtained thereby, effective in a wide range of hydrocarbon-conversion reactions, such as the polymerization of olefins, the isomerization of olefins, the alkylation of aromatics, the desulfurization of sulfur-containing stocks, and the like.

We have now discovered that a catalyst of further improved properties can be obtained by heating a titanium chloride or bromide with orthophosphoric acid or pyrophosphoric acid in the presence of a metallic oxide having hydrogenation-dehydrogenation properties. The reaction is continued at a temperature and for a time sufficient to drive off hydrogen halide equivalent to substantially all of the halogen in the titanium halide, and a gray, friable solid is obtained thereby of high activity, high selectivity, and low coke-forming tendencies.

One object of our invention is to prepare an improved hydrocarbon-conversion catalyst. Another object is to prepare a catalyst of high selectivity in the polymerization, alkylation, isomerization, and desulfurization of hydrocarbons. A further object is to prepare a titanium-based catalyst of moderated activity and improved selectivity. Another object is to prepare an oxide-promoted, acid-modified, titanium-based catalyst. Another object is to prepare a solid titanium-based catalyst. Other objects of the invention and its superiority over the prior art will be apparent from the present description and claims.

A convenient method of preparing our new catalyst is to suspend or dissolve a group V or group VI metallic oxide, preferably the latter, in phosphoric acid in a stirred vessel, commingle titanium halide therewith, and then warm the mixture to such a temperature that hydrogen halide is evolved smoothly in a steady stream. The reaction begins at ordinary temperatures, and proceeds rapidly at 60 to 100° C. As hydrogen halide evolution slows down, the temperature is raised gradually or stepwise to a maximum of 175° C. or above, preferably between about 175 and 250° C., optimally around 200° C., where it is maintained until hydrogen halide evolution has approached the theoretical (e. g., 3.5 to 4 moles per mole of titanium tetrahalide) and has practically ceased, and the original yellow color of the mixture has changed to gray. It is important to subject the reaction mixture to a temperature above about 175° C. for a sufficient length of time to drive off hydrogen halide in a quantity approaching the theoretically derivable amount, the most active catalysts being obtained at about 96 percent or more of the theoretical hydrogen halide evolution. Inadequate heating produces a yellow, inactive catalyst, which, however, can be converted into the gray, highly active material by a supplemental heating under the defined conditions.

An alternative procedure which may be followed is to dissolve or suspend the group V or group VI metallic oxide in the titanuim halide, then add the acid, and heat as before. As a further alternative, the titanium halide and the phosphoric acid may be commingled, and the metallic oxide may be added thereto either before or during the subsequent heating step. As a still further alternative, the reaction of titanium halide and phosphoric acid can be carried out in the presence of a substance, e. g. chormic acid, ammonium molybdate, vanadic acid, and the like, affording an oxide of the defined type under the reaction conditions employed. In general it can be said that any manipulative procedure which effects the reaction of phosphoric acid with tatanium halide in the presence of a group V or group VI metallic oxide having hydrogenation-dehydrogenation properties, and which results in the evolution of substantially the theoretical proportion of hydrogen halide, will be suitable for preparing our new catalyst composition.

Catalysts of our new class can satisfactorily be prepared from titanium tetrachloride, titanium tetrabromide, and other titanium chlorides and bromides. Suitable acids include orthophosphoric ($H_3PO_4$) and pyrophosphoric acids, the former being preferred. As activators, we may suitably use oxides of group V or group VI metals having hydrogenation-dehydrogenation properties, such as chromia, molybdena, vanadia, urania, tungsten oxide, and the like. The proportion of such oxide should be between about 0.5 and 20 percent by weight, preferably between about 1 and 5 percent by weight, based on anhydrous phosphoric acid. Titanium tetrachloride, for example, reacts readily with orthophosphoric acid and gives good yields of solids which vary in consistency according to the ratio of the reactants. Semisolids are obtained when as little as 0.24 mole of $TiCl_4$ is allowed to react with one mole of $H_3PO_4$ in the presence of the minimum proportion of promoting oxide, while dry solids are obtained at a ratio of 0.38 or more. At ratios higher than about 0.7 mole per mole, the reaction product contains unreacted $TiCl_4$; such higher ratios should therefore be used only where the presence of the resulting free $TiCl_4$ in the reaction product is not objectionable. In general, we prefer to contact titanium halide with phosphoric acid $H_3PO_4$ in a molar ratio between about 0.4:1 and 0.6:1.

The reaction proceeds more readily and gives higher yields if the phosphoric acid is anhydrous or substantially in an atomic ratio of halogen to active hydrogen between about 0.4:1 and 1:1, and we prefer to contact $TiCl_4$ with anhydrous—i. e., contains less than about 2.5 percent by weight of water.

Our new catalysts is a stable solid, and does not ordinarily require the use of a supporting material.

The catalysts described herein are useful in a variety of hydrocarbon-conversion reactions. They may, for example, be used under conventional conditions for the polymerizations of unsaturated hydrocarbons to form liquids of higher molecular weight, the alkylation of aromatics or isoparaffins with olefins or olefin-affording substances, the isomerization of paraffins, the side-chain dehydrogenation of alkyl-substituted aromatics, the treatment of motor fuels to increase their antiknock rating, and the like.

Our catalysts are highly effective for simultaneous isomerization and dehydrogenation, for example in the production of aromatics by dehydrogenation of naphthenic petroleum stocks. Thus, in the production of benzene from a methylcyclopentane-cyclohexane fraction by conventional processes, the methylcyclopentane is largely unavailable for conversion to aromatics, and is consequently lost. This loss can be prevented by isomerizing the cyclopentane compounds to cyclohexanes either preliminary to the dehydrogenation or simultaneously with it. The simultaneous isomerization and dehydrogenation reactions are readily accomplished by use of our new catalysts, which moreover perform the desired function with a minimum of side reactions such as coke and gas formation and with a maximum yield of the desired aromatics. In general, the hydrocarbon stream to be isomerized and dehydrogenated should be passed over our catalyst at a temperature in the range of 150 to 500° C., preferably 200 to 450° C. Hydrogen should be cycled over the catalyst with the charging stock at a hydrogen partial pressure in the range of 100 to 5000 pounds per square inch, preferably 200 to 1000 pounds per square inch. The liquid hourly space velocity may suitably lie within the range of about 0.5 to 4.

Our catalysts are outstandingly effective in the removal of sulfur from petroleum fractions containing organic sulfur compounds, as described in the copending application of Wilford J. Zimmerschied and Harold Shalit, Serial No. 323,520, filed December 1, 1952, now U. S. Patent 2,726,991. The desulfurization is carried out most advantageously at a temperature between about 200 and 500° C., preferably 350 to 450° C., a hydrogen pressure up to about 1500 pounds per square inch or above, preferably 200 to 1000 pounds per square inch, and a liquid hourly space velocity between about 0.5 and 4.

Our catalyst is conveniently employed as a powder, slurried in the charging stock, or as solid particles, pellets or pills, in a fixed or moving bed. Numerous alternative processes and reactor designs will be apparent to those skilled in the art.

Our invention will be more fully understood from the following specific examples.

*Example 1*

A solid catalyst was prepared by heating a mixture of 98 grams of anhydrous $H_3PO_4$, two grams of $CrO_3$, and 72.9 grams of $TiCl_4$ to a temperature ranging from 150 to 200° C. until HCl evolution substantially ceased. The resulting solid was formed into ⅛-inch pellets.

The catalyst obtained in this way is suitable for effecting the simultaneous isomerization and dehydrogenation of methylcyclopentane at a temperature around 400° C., a hydrogen partial pressure around 1000 pounds per square inch, and a liquid hourly space velocity of about 1, producing benzene in good yield.

*Example 2*

Into a flow reactor were placed 50 milliliters of the pelleted catalyst described in Example 1. The reactor was heated to a temperature of 385° C. and pressured with hydrogen to 960 pounds per square inch, and through it wasa passed a vaporized stream of West Texas virgin naphtha at a liquid hourly space velocity of 1.2. The product was collected in two fractions, which were analyzed separately. The results were as follows:

| | Charging Stock | Product | |
|---|---|---|---|
| | | Fraction 1 | Fraction 2 |
| Yield, vol.-percent | ---------- | 28 | 52 |
| Bromine No. | 4.1 | 2.6 | 2.3 |
| S content, percent | 0.318 | 0.046 | 0.038 |
| Desulfurization, percent | ---------- | 86 | 88 |

The total product yield, based on the charging stock, was 80 volume-percent.

In contrast to the above results, an unpromoted $TiCl_4$-$H_3PO_4$ catalyst was substantially less effective in desulfurizing a West Texas virgin naphtha. Into a flow reactor were placed 40 milliliters (43.3 grams) of a ⅛-inch pelleted catalyst prepared by heating 103.5 grams (approximately 1 mole) of anhydrous $H_3PO_4$ with 122 grams (0.64 mole) of $TiCl_4$ to a temperature ranging from 150 to 200° C. for one hour. The reactor was heated to a temperature of 395° C. and pressured with hydrogen at 600 pounds per square inch, and through it was passed a vaporized stream of West Texas virgin naphtha (0.324 percent sulfur) at a liquid hourly space velocity of 2. A 98 volume-percent yield of liquid product containing 0.114% sulfur was obtained, corresponding to a desulfurization of 65%.

*Example 3*

Over the catalyst described in Example 1 was passed a vaporous stream of coke still naphtha at a temperature of 450° C., a hydrogen pressure of 1075 pounds per square inch, and a liquid hourly space velocity of 2.3. The product was collected in two fractions, which were analyzed separately, with the following results:

| | Charging Stock | Product | |
|---|---|---|---|
| | | Fraction 1 | Fraction 2 |
| Aromatics content, vol.-percent | 10.9 | 24.4 | ---------- |
| Olefin content, vol.-percent | 37.4 | 10.3 | ---------- |
| Bromine No. | 64.1 | 32.1 | 30.0 |
| S content, percent | 0.510 | 0.267 | 0.254 |
| Yield, vol.-percent | ---------- | 41 | 42 |
| Desulfurization, percent | ---------- | 48 | 50 |

The observed aromatics and olefin contents of fraction 1 indicated that extensive alkylation of aromatics had taken place.

*Example 4*

Orthophosphoric acid (114 grams), titanium tetrachloride (85 grams) and molybdenum trioxide, $MoO_3$ (2.3 grams), were mixed and heated to a maximum of 86° C. for 17 hours. The temperature was then raised to a maximum of 200° C. over a period of 6 hours. The reaction product was outgassed in a vacuum oven at 115° C., and was finally crushed and formed into ⅛-inch pellets. The pelleted catalyst, having a crushing strength of 5 to 7 pounds, was tested in the vapor-phase desulfurization of a West Texas virgin heavy naphtha containing 0.355 percent by weight of sulfur. The treated naphtha was collected in two fractions, which were analyzed separately. For comparison, similar tests were run on an unpromoted "Tifo" catalyst, prepared according to substantially the same procedure by reacting 151.5 grams of anhydrous orthophosphoric acid with 194.5 grams of titanium tetrachloride. The results are presented in the following table:

| Promoter | Temp., ° C. | Press., p.s.i.g. | Liquid Sp. Vel., hr.⁻¹ | Product Yield, vol.-percent | Product S, wt.-percent | Desulfurization, percent |
|---|---|---|---|---|---|---|
| $MoO_3$ | 396 | 1,000 | 2.0 | 28<br>60 | 0.073<br>0.069 | 80<br>81 |
| None | 398 | 1,000 | 1.6 | 48<br>46 | 0.114<br>0.097 | 68<br>73 |
| None | 416 | 1,000 | 1.8 | 46<br>48 | 0.086<br>0.095 | 76<br>73 |

*Example 5*

Orthophosphoric acid (130 grams), titanium tetrachloride (126 grams), and hydrous tungsten trioxide, $WO_3.H_2O$ (3 grams), were mixed, and it was observed that HCl was liberated and a fluffy, yellowish, solid mass was formed before heat was applied. The mixture was heated to a maximum of 80° C. for 18 hours, and the temperature was then raised over a period of 8 hours to 205° C. The reaction product was dried in a vacuum oven and formed into ⅛-inch pellets having a crushing strength of 6 to 8 pounds. The completed catalyst was tested as described in Example 4, with the following results:

| Promoter | Temp., ° C. | Press., p.s.i.g. | Liquid Sp. Vel., hr.$^{-1}$ | Product Yield, vol.-percent | Product S, wt.-percent | Desulfurization, percent |
|---|---|---|---|---|---|---|
| $WO_3$ | 395 | 1,000 | 2.0 | 28 | 0.054 | 85 |
| | | | | 60 | 0.056 | 84 |
| $WO_3$ | 396 | 200 | 1.6 | 29 | 0.096 | 73 |
| | | | | 42 | 0.100 | 72 |
| | | | | 28 | 0.095 | 73 |
| None | 398 | 1,000 | 1.6 | 48 | 0.114 | 68 |
| | | | | 46 | 0.097 | 73 |
| None | 416 | 1,000 | 1.8 | 46 | 0.086 | 76 |
| | | | | 48 | 0.095 | 73 |

*Example 6*

Orthophosphoric acid (98 grams), titanium tetrachloride (95 grams), and vanadium pentoxide, $V_2O_5$ (2 grams), were mixed, heated, dried, and pelleted as described in Example 5. The pellets had a crushing strength of 6 to 7 pounds. The completed catalyst was tested as described in Example 4, with the following results:

| Promoter | Temp., ° C. | Press., p.s.i.g. | Liquid Sp. Vel., hr.$^{-1}$ | Product Yield, vol.-percent | Product S, wt.-percent | Desulfurization, percent |
|---|---|---|---|---|---|---|
| $V_2O_5$ | 396 | 1,000 | 1.9 | 50 | 0.090 | 75 |
| | | | | 43 | 0.085 | 76 |
| $V_2O_5$ | 400 | 200 | 1.6 | 32 | 0.115 | 68 |
| | | | | 62 | 0.113 | 68 |
| None | 398 | 1,000 | 1.6 | 48 | 0.114 | 68 |
| | | | | 46 | 0.097 | 73 |
| None | 416 | 1,000 | 1.8 | 46 | 0.086 | 76 |
| | | | | 48 | 0.095 | 73 |

While the foregoing specific examples illustrate advantageous embodiments of our invention, it is to be understood that we are not limited thereto, but rather that the true scope of our invention is evidenced by the broad disclosure thereof and by the appended claims. In general it can be said that any modifications or equivalents of our invention that would ordinarily occur to one skilled in the art are to be considered as lying within the scope of our invention.

Our new catalyst compositions are comparatively inexpensive and conveniently made. They are stable in contact with air, and do not tend to form massive aggregates in the presence of water. They are highly active for many hydrocarbon conversions; nevertheless, they are quite selective, and have so little tendency to cause disproportionation, coke deposition, and other side reactions that they have a long useful life.

In accordance with the foregoing description, we claim as our invention:

1. A process for the manufacture of a solid, self-supporting catalyst which consists essentially of mixing a substantially anhydrous phosphoric acid selected from the group consisting of orthophosphoric and pyrophosphoric acids, a titanium halide selected from the group consisting of the chlorides and bromides of titanium in an atomic ratio of halogen to acive hydrogen in said acid between about 0.4:1 and 1:1, and a promoter in a concentration between about 0.5 and 20 percent by weight based on said acid, said promoter being selected from the class consisting of groups V and VI metallic oxides having hydrogenation-dehydrogenation properties, and heating the resulting mixture at a temperature above about 175° C. until evolution of hydrogen halide therefrom substantially ceases and approximates the theoretical quantity of hydrogen halide.

2. A process for the manufacture of a solid, self-supporting catalyst which consists essentially of mixing a titanium chloride with substantially anhydrous orthophosphoric acid in an atomic ratio of chlorine to active hydrogen between about 0.4:1 and 1:1 and between about 0.5 and 20 percent by weight based on said acid of an oxide of a metal chosen from groups V and VI, said oxide having hydrogenation-dehydrogenation properties, and heating the resulting mixture at a temperature above about 175° C. until evolution of hydrogen chloride therefrom substantially ceases and approximates the theoretical quantity of hydrogen chloride.

3. A process for the manufacture of a solid, self-supporting catalyst which consists essentially of mixing titanium tetrachloride with substantially anhydrous orthophosphoric acid in a molar ratio above about 0.38:1 and between about 0.5 and 20 percent by weight based on said acid of an oxide of a metal chosen from groups V and VII, said oxide having hydrogenation-dehydrogenation properties, heating the resulting mixture to a temperature above about 175° C. to promote interaction of the components thereof with evolution of hydrogen chloride, and continuing said heating until said evolution of hydrogen chloride exceeds 3.5 moles per mole of titanium tetrachloride and substantially ceases.

4. A process for the manufacture of a solid, self-supporting catalyst which consists essentially of mixing titanium tetrachloride with substantially anhydrous orthophosphoric acid in a molar ratio between about 0.38:1 and 0.7:1 and between about 1 and 5 percent by weight based on said acid of an oxide of a metal chosen from groups V and VI, said oxide having hydrogenation-dehydrogenation properties, heating the resulting mixture to a temperature above about 175° C. to promote interaction of the components thereof with evolution of hydrogen chloride, and continuing said heating until said evolution of hydrogen chloride exceeds 3.5 moles per mole of titanium tetrachloride and substantially ceases.

5. A process for the manufacture of a solid, self-supporting catalyst which consists essential of mixing substantially anhydrous orthophosphoric acid, between about 1 and 5 percent by weight of chromia based on said acid, and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

6. A process for the manufacture of a solid, self-supporting catalyst which consists essentially of mixing substantially anhydrous orthophosphoric acid, between about 1 and 5 percent by weight of molybdena based on said acid, and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

7. A process for the manufacture of a solid-self-supporting catalyst which consists essentially of mixing substantially anhydrous orthophosphoric acid, between about 1 and 5 percent by weight of tungsten oxide based on said acid, and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

8. An oxide-promoted titanium-phosphorus catalyst composition prepared by the process which consists essentially of mixing a substantially anhydrous phosphoric acid selected from the group consisting of orthophosphoric and pyrophosphoric acids, a titanium halide selected from the group consisting of the chlorides and bromides of titanium in an atomic ratio of halogen to active hydrogen in said acid between about 0.4:1 and 1:1, and a promoter in a concentration between about 0.5 and 20 percent by weight based on said acid, said promoter being selected from the class consisting of groups V and VI metallic oxides having hydrogenation-dehydrogenation properties, and heating the resulting mixture at a temperature above about 175° C. until evolution of hydrogen halide therefrom substantially ceases and approximates the theoretical quantity of hydrogen halide.

9. An oxide-promoted titanium-phosphorus catalyst composition, prepared by the process which consists essentially of mixing a titanium chloride with substantially anhydrous orthophosphoric acid in an atomic ratio of chlorine to active hydrogen between about 0.4:1 and 1:1 and between about 0.5 and 20 percent by weight based on said acid of an oxide of a metal chosen from groups V and VI, said oxide having hydrogenation-dehydrogenation properties, and heating the resulting mixture at a temperature above about 175° C. until evolution of hydrogen chloride therefrom substantially ceases and approximates the theoretical quantity of hydrogen chloride.

10. An oxide-promoted titanium-phosphorus catalyst composition, prepared by the process which consists essentially of mixing titanium tetrachloride with substantially anhydrous orthophosphoric acid in a molar ratio above about 0.38:1 and between about 0.5 and 20 percent by weight based on said acid of an oxide of a metal chosen from groups V and VI, said oxide having hydrogenation-dehydrogenation properties, heating the resulting mixture to a temperature above about 175° C. to promote interaction of the components thereof with evolution of hydrogen chloride, and continuing said heating until said evolution of hydrogen chloride exceeds 3.5 moles per mole of titanium tetrachloride and substantially ceases.

11. An oxide-promoted titanium-phosphorus catalyst composition, prepared by the process which consists essentially of mixing titanium tetrachloride with substantially anhydrous orthophosphoric acid in a molar ratio between about 0.38:1 and 0.7:1 and between about 1 and 5 percent by weight based on said acid of an oxide of a metal chosen from groups V and VI, said oxide having hydrogenation-dehydrogenation properties, heating the resulting mixture to a temperature above about 175° C. to promote interaction of the components thereof with evolution of hydrogen chloride, and continuing said heating until said evolution of hydrogen chloride exceeds 3.5 moles per mole of titanium tetrachloride and substantially ceases.

12. A chromia-promoted titanium-phosphorus catalyst composition, prepared by the process which consists essentially of mixing substantially anhydrous orthophosphoric acid, between about 1 and 5 percent by weight of chromia based on said acid, and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

13. A molybdena-promoted titanium-phosphorus catalyst composition, prepared by the process which consists essentially of mixing substantially anhydrous orthophosphoric acid, between about 1 and 5 percent by weight of molybdena based on said acid, and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

14. A tungsten oxide-promoted titanium-phosphorus catalyst composition, prepared by the process which consists essentially of mixing substantially anhydrous orthophosphoric acid, between about 1 and 5 percent by weight of tungsten oxide based on said acid, and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

15. A process for the manufacture of a solid, self-supporting catalyst which consists essentially of mixing substantially anhydrous orthophosphoric acid, between about 1 and about 5% by weight of vanadium pentoxide based on said acid and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

References Cited in the file of this patent

UNITED STATES PATENTS

| | | |
|---|---|---|
| 2,358,011 | Ipatieff et al. | Sept. 12, 1944 |
| 2,365,895 | Mavity | Dec. 26, 1944 |
| 2,569,092 | Deering | Sept. 25, 1951 |
| 2,608,534 | Fleck | Aug. 26, 1952 |